US012467021B2

(12) United States Patent
Newell

(10) Patent No.: US 12,467,021 B2
(45) **Date of Patent: *Nov. 11, 2025**

(54) SYSTEM, APPARATUS, AND METHOD FOR CLEANING

(71) Applicant: James R. Newell, Allendale, NJ (US)

(72) Inventor: James R. Newell, Allendale, NJ (US)

(*) Notice: Subject to any disclaimer, the term of this patent is extended or adjusted under 35 U.S.C. 154(b) by 286 days.

This patent is subject to a terminal disclaimer.

(21) Appl. No.: 18/296,013

(22) Filed: Apr. 5, 2023

(65) Prior Publication Data

US 2023/0323254 A1 Oct. 12, 2023

Related U.S. Application Data

(63) Continuation of application No. 17/716,216, filed on Apr. 8, 2022, now Pat. No. 11,667,872.

(51) Int. Cl.

| | |
|---|---|
| ***C11D 13/00*** | (2006.01) |
| ***A47K 7/03*** | (2006.01) |
| ***C11D 13/30*** | (2006.01) |
| ***C11D 17/00*** | (2006.01) |
| ***C11D 17/04*** | (2006.01) |

(52) U.S. Cl.

CPC ................ *C11D 13/30* (2013.01); *A47K 7/03* (2013.01); *C11D 17/0095* (2013.01); *C11D 17/04* (2013.01)

(58) Field of Classification Search

None

See application file for complete search history.

(56) References Cited

U.S. PATENT DOCUMENTS

| | | | |
|---|---|---|---|
| 692,481 | A | 2/1902 | Robinson |
| 1,320,855 | A | 11/1919 | Henderson |
| 1,495,978 | A | 6/1924 | Anderson |
| 2,271,959 | A | 2/1942 | Swanson |
| 2,975,485 | A | 3/1961 | Wendt |
| 3,553,138 | A | 1/1971 | Mace |
| 3,931,035 | A | 1/1976 | Brown |
| 4,296,064 | A | 10/1981 | Satcher |
| 4,402,848 | A | 9/1983 | Brewer |

(Continued)

FOREIGN PATENT DOCUMENTS

| | | |
|---|---|---|
| AU | 651815 | 4/1994 |
| CN | 102899207 | 1/2013 |

(Continued)

OTHER PUBLICATIONS

International Search Report and Written Opinion dated Jul. 19, 2023, in international PCT counterpart application PCT/US2023/064543 (10 pages).

*Primary Examiner* — Necholus Ogden, Jr.
(74) *Attorney, Agent, or Firm* — Keefe IP Law, PLLC

(57) ABSTRACT

A method is disclosed. The method includes providing a cleaning member formed from a consumable cleaning material and including a cavity formed by one or more interior walls of the cleaning member, inserting a cleaning member remnant through an aperture of the cavity formed at a first end surface of a first end portion of the cleaning member, providing and holding a fluid in the cavity holding the cleaning member remnant when the first end surface is facing upward, and attaching the cleaning member remnant to the one or more interior walls based on holding the fluid.

20 Claims, 8 Drawing Sheets

(56) References Cited

U.S. PATENT DOCUMENTS

| | | | | |
|---|---|---|---|---|
| 4,582,625 | A | 4/1986 | George | |
| 4,741,852 | A | 5/1988 | Ondracek | |
| 4,917,589 | A | 4/1990 | Manderson | |
| 4,965,008 | A | 10/1990 | Chang | |
| 5,221,506 | A | 6/1993 | Dulin | |
| 5,250,210 | A | 10/1993 | Von Culin | |
| 5,536,433 | A | 7/1996 | De Gaye | |
| 5,876,769 | A | 3/1999 | Dowden | |
| 6,116,753 | A | 9/2000 | Tsang | |
| 9,162,378 | B1 | 10/2015 | Spell | |
| D830,629 | S | 10/2018 | Smith, Jr. | |
| 2005/0133385 | A1 | 6/2005 | Bahash | |
| 2005/0277566 | A1 | 12/2005 | Grissett | |
| 2005/0277567 | A1 | 12/2005 | Macedo | |
| 2007/0270322 | A1 | 11/2007 | Pak | |
| 2009/0029891 | A1 | 1/2009 | Callahan | |
| 2012/0071387 | A1 | 3/2012 | Aesch | |
| 2015/0152367 | A1 * | 6/2015 | Manning | C11D 3/48 53/473 |
| 2015/0152368 | A1 | 6/2015 | Murphy | |
| 2015/0198296 | A1 | 7/2015 | Del Rosario | |
| 2017/0181585 | A1 | 6/2017 | Khamis | |

FOREIGN PATENT DOCUMENTS

| | | | |
|---|---|---|---|
| DE | 2540896 | | 3/1977 |
| DE | 2654392 | | 6/1978 |
| DE | 3934094 | | 5/1989 |
| EP | 2902472 | | 8/2015 |
| FR | 734565 | | 10/1932 |
| FR | 2479257 | | 10/1981 |
| GB | 7935 | | 5/1898 |
| GB | 2125427 | | 3/1984 |
| GB | 2295398 | | 5/1996 |
| JP | H028300 | A | 1/1990 |
| WO | 1999040172 | | 8/1999 |
| WO | 2016209182 | | 12/2016 |
| WO | 2019023783 | | 2/2019 |
| WO | 2020082139 | | 4/2020 |

* cited by examiner

SYSTEM, APPARATUS, AND METHOD FOR CLEANING

CROSS-REFERENCE TO RELATED APPLICATIONS

This application claims priority to nonprovisional application Ser. No. 17/716,216 filed Apr. 8, 2022, the entire disclosure of each of which is incorporated herein by reference.

TECHNICAL FIELD

The present disclosure generally relates to a system, apparatus, and method, and more particularly to a system, apparatus, and method for cleaning.

BACKGROUND

Typical soap products involve significant waste and plastics that have a harmful effect on the environment after the soap product is used. For example, liquid soap, shampoo, and conditioner typically are housed in plastic containers that are thrown away after use. Some conventional systems exist for attempting to reduce plastic used in cleaning products and for re-using portions of bar soap. For example, conventional systems exist for attempting to add a remnant of a used soap bar to a new soap bar in order to avoid waste of soap remnants and slivers. However, conventional systems for attempting to reuse soap remnants suffer from the deficiencies discussed below.

Some conventional systems attempt to encase a used soap sliver, but such systems often experience portions of the soap flaking or breaking off, for example as new soap is worn thin, close to the remnant in the soap cavity. Conventional systems are typically unable to produce an adhering and/or integrating effect of the remnant soap into the newer soap, with the remnant soap often falling or breaking away from the newer soap. Other conventional systems simply preserve the soap remnant at a central portion of a new soap bar, which often results in the older soap remnant being preserved as newer soap is used. This ultimately typically results in the old portion of soap being reused and inserted into successive new bars, as the old portion is not eliminated. Further, as remnant soap is preserved over a period of time in the newer soap, the relatively older oils of the remnant soap become rancid and unsanitary, which defeats the purpose of using soap for cleaning.

U.S. patent publication number 2015/0152368 to Murphy (the '368 reference) attempts to address some of the above shortcomings in the prior art by providing a cavity for receiving soap remnants. However, as best understood, the cavity of the '368 reference simply preserves a relatively older and more heavily used soap remnant at the center of a relatively newer and less used bar of soap, which apparently merely preserves the older soap while the newer soap is utilized instead.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method. The method includes providing a cleaning member formed from a consumable cleaning material and including a cavity formed by one or more interior walls of the cleaning member, inserting a cleaning member remnant through an aperture of the cavity formed at a first end surface of a first end portion of the cleaning member, providing and holding a fluid in the cavity holding the cleaning member remnant when the first end surface is facing upward, and attaching the cleaning member remnant to the one or more interior walls based on holding the fluid.

In another aspect, the present disclosure is directed to apparatus for integrating a cleaning member remnant using a fluid. The apparatus includes a cleaning member formed from consumable cleaning material, and a cavity formed in the cleaning member by one or more interior walls of the cleaning member. The cavity is configured to receive the cleaning member remnant through an aperture of the cavity disposed at a first surface of a first end portion of the cleaning member. A second end portion of the cleaning member, which is disposed at an opposite side of the cleaning member as the first end portion, forms at least part of the one or more interior walls of the cavity and forms a second surface. The cavity is configured to hold the cleaning member remnant and the fluid when the cleaning member is supported on the second surface.

DETAILED DESCRIPTION AND INDUSTRIAL APPLICABILITY

FIGS. 1-4 illustrate an exemplary embodiment of the exemplary disclosed system, apparatus, and method. System 100 may include a member 105 that may be used by a user 110 for example as described herein. System 100 may provide a system that protects the environment by significantly reducing waste associated with cleaning products.

Member 105 may be a cleaning member (e.g., a cleaning article or member). Member 105 may be a solid structure consumable good. Member 105 may be a cleaning bar (e.g., a cleaning bar or a cleaning cake). Member 105 may be a personal hygiene member such as, for example, a personal hygiene bar. Member 105 may be a soap bar. Member 105 may be a shampoo bar and/or a conditioner bar. Member 105 may be a non-soap bar. Member 105 may be a lotion bar and/or a moisturizer bar. Member 105 may be a dishwashing bar. Member 105 may be a laundry stain-removing bar. Member 105 may be a vehicle cleaning bar such as, for example, a car detailing bar.

In at least some exemplary embodiments, member 105 may be formed by consumable material such as consumable cleaning material. Member 105 may be formed from oil, fat, lye, alkali, and/or water. Member 105 may include palmitic acid, ricinoleic acid, oleic acid, myristic acid, stearic acid, linolenic acid, linoleic acid, lauric acid, and/or any other suitable type of fatty acid. Member 105 may include coconut oil, palm oil, coconut butter, palm kernel oil, hemp oil, olive oil, rapeseed oil, babassu oil, soybean oil, illipe butter, sunflower oil, castor oil, pomegranate seed oil, and/or any other suitable soap oil. Member 105 may include KOH, potassium hydroxide, NaOH, sodium hydroxide, and/or any other suitable lye.

In at least some exemplary embodiments, member 105 may be a non-soap bar that may include synthetic chemicals. For example, member 105 may include petrochemicals, oleochemicals, fatty acids, sulfur trioxide, ethylene oxide, alkalis (e.g., sodium hydroxide), and/or any other suitable synthetic materials for forming a cleaning bar.

In at least some exemplary embodiments, member 105 may be a dishwashing bar including detergent and/or any other suitable material for dishwashing. Member 105 may also be a laundry stain-removing bar including hydrogen peroxide and/or any other suitable material for removing stains from clothes, fabric, or textiles. Member 105 may be a vehicle cleaning bar including resin and/or any other suitable material for removing dirt and debris from a surface of a vehicle.

Figure 4:
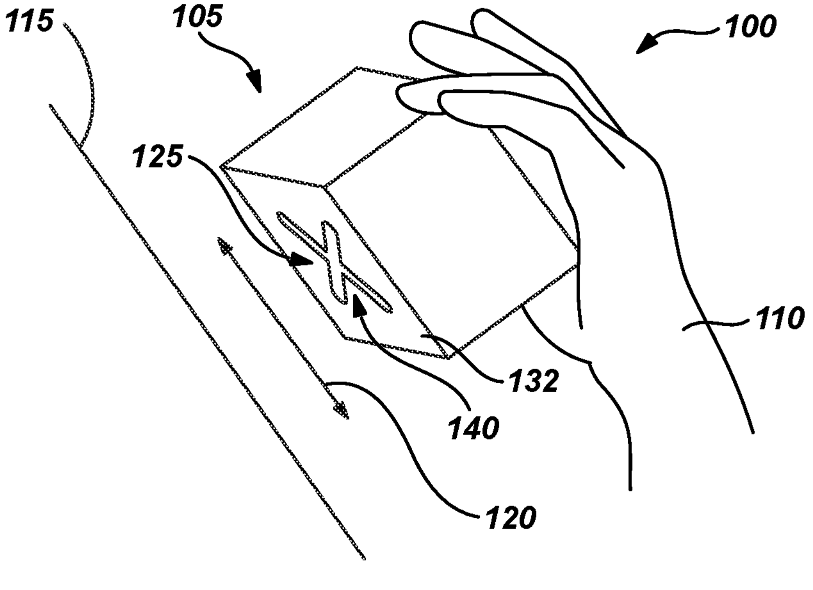
FIG. 4 is a perspective view of an exemplary embodiment of the present invention.

Member 105 may be any suitable shape or configuration for providing a cleaning member. For example as illustrated in FIG. 4, member 105 may be any suitable shape for user 110 to use member 105 to clean a surface 115 such as the user's body (e.g., skin or hair), a surface of clothes, dishes, or other household objects, a surface of a vehicle, and/or any other suitable surface to be cleaned. For example, member 105 may be a rectangular prism, a cube, a spherically or annularly shaped member, a curved member, a polygonal prism, or any other suitable shape for user 110 to hold (e.g., grip or hold) member 105 for cleaning surface 115. For example, member 105 may be of any suitable shape or configuration for user 110 to hold member 105 while contacting (e.g., pressing and/or sliding) member 105 in a plane 120 that may be parallel to surface 115. User 110 may thereby utilize member 105 to clean any suitable surface or surface portion such as surface 115.

Member 105 may have any suitable height H, width W, and length L. Height H, width W, and length L may be any suitable dimensions to facilitate comfortable holding (e.g., gripping) of member 105 by a hand of user 110. For example, member 105 may be a cube having height H, width W, and length L that are substantially equal (e.g., equal). Member 105 may also for example be a rectangular prism in which any two of height H, width W, and length L may be substantially equal and the third of height H, width W, and length L may be greater than the other two dimensions. In at least some exemplary embodiments, each of height H, width W, and length L may be between about 2 inches and about 3 inches. In at least some exemplary embodiments, each of height H, width W, and length L may be about 2.5 inches.

Figure 3:
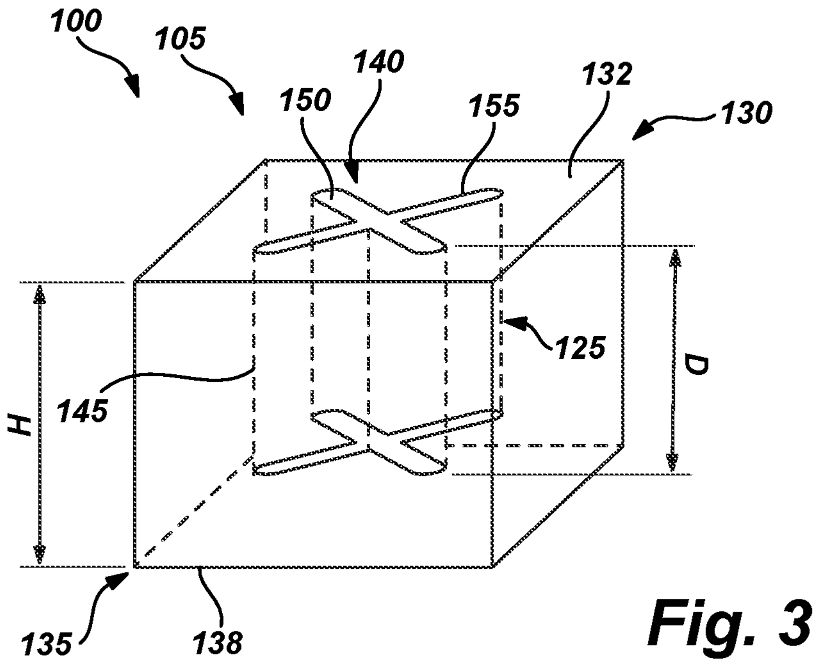
FIG. 3 is a perspective view of an exemplary embodiment of the present invention.

Member 105 may include a cavity 125. Cavity 125 may extend from a first end portion 130, which may form a first end surface 132 of member 105, toward a second end portion 135, which may form a second end surface 138 of member 105. In at least some exemplary embodiments, first end surface 132 may be a top surface of member 105 and second end surface 138 may be a bottom surface of member 105. First end portion 130 and first end surface 132 may be disposed at an opposite side of member 105 as second end portion 135 and second end surface 138. An aperture 140 disposed at first end surface 132 may allow access by user 110 to cavity 125. For example as illustrated in FIG. 3, cavity 125 may be formed by a plurality of interior walls 145 of member 105. Interior walls 145 and cavity 125 may be formed by using a mold to provide the shape of member 105 (e.g., including cavity 125), cutting out and removing material from member 105 to form cavity 125, and/or any other suitable technique for forming cavity 125 in member 105.

Figure 1:
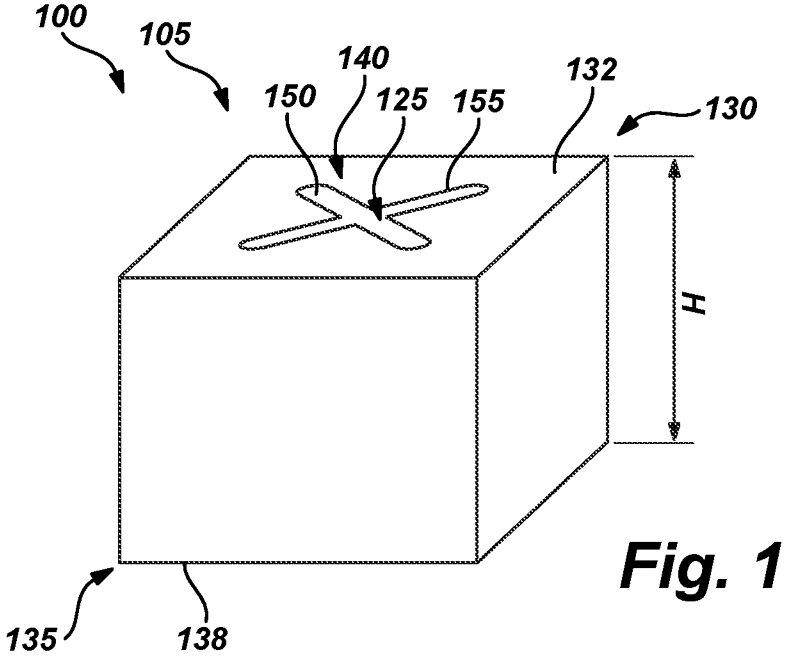
FIG. 1 is a perspective view of an exemplary embodiment of the present invention.
Figure 2:
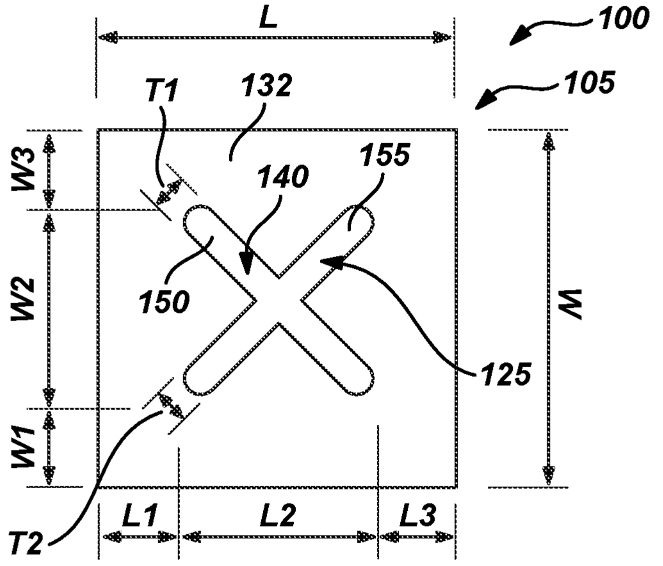
FIG. 2 is a top view of an exemplary embodiment of the present invention.

Cavity 125 may be disposed at any suitable location or configuration in member 105. For example as illustrated in FIGS. 1 and 2, cavity 125 may be substantially centered in member 105 (e.g., or may be disposed at an off-center position of member 105). Cavity 125 may be of any suitable size for facilitating receiving material portions for example as described below. For example, cavity 125 may have a cavity width W2 and a cavity length L2. In at least some exemplary embodiments, each of cavity width W2 and cavity length L2 may be between about 1.25 inches and about 2.25 inches, or between about 1.5 inches and about 2 inches. For example, each of cavity width W2 and cavity length L2 may be about 1.75 inches. Cavity 125 may be disposed at a distance L1, a distance L3, a distance W1, and/or a distance W3 from edges of member 105 for example as illustrated in FIG. 2. Distances L1, L3, W1, and W3 may be large enough so that portions of member 105 forming interior walls 145 do not break or flake off during the exemplary disclosed method using member 105. Each of distances L1, L3, W1, and W3 may be between about 0.25 inches and about 0.75 inches. For example, each of distances L1, L3, W1, and W3 may be about 0.375 inches. In at least some exemplary embodiments, cavity width W2 and cavity length L2 may be substantially equal, and each of distances L1, L3, W1, and W3 may be substantially equal.

Cavity 125 may be formed in any suitable configuration for receiving material portions for example as described below. In at least some exemplary embodiments, cavity 125 may have an X-shaped cross-section formed from a first leg 150 crossed with a second leg 155. Legs 150 and 155 may be elongated recesses or slots. First leg 150 may have a thickness T1 and second leg 155 may have a thickness T2. Thicknesses T1 and T2 may each have any suitable thickness for receiving material portions in cavity 125 for example as described herein. For example, each of thicknesses T1 and T2 may be between about 0.125 inches and about 0.375 inches. For example, each of thicknesses T1 and T2 may be about 0.25 inches. Thicknesses T1 and T2 may have substantially the same thickness or may have different thicknesses. In at least some exemplary embodiments, cavity 125 may have an X-shape that may increase a cross-section (e.g., volume) available to hold material portions (e.g., remnants) while increasing structural integrity of member 105 (e.g., increasing interior wall portions 145 of member 105 forming cavity 125).

In at least some exemplary embodiments and as illustrated in FIG. 3, cavity 125 may extend a depth D into an interior of member 105 from first end surface 132. Each of thicknesses T1 and T2 may remain substantially constant along portions of a length of depth D, may taper inward along portions of the length of depth D, and/or may taper outward (e.g., increase in size) along the length of depth D. In at least some exemplary embodiments, thicknesses T1 and T2 may remain substantially constant along a substantially entire length of depth D. Depth D may be any suitable depth for receiving material portions in cavity 125 for example as described herein. For example, depth D may be between about 1.75 inches and about 2.25 inches. For example, depth D may be about 2 inches. Legs 150 and 155 may have respective depths D that may be substantially equal or that may be different.

Height H, width W, length L, cavity width W2, cavity length L2, distance W1, distance W3, distance L1, distance L3, thickness T1, thickness T2, and depth D may have any suitable relative sizes (e.g., dimensions) for facilitating receiving material portions in cavity 125 for example as described herein. For example, depth D may be between about 70% and about 85% of height H, between about 75% and about 85% of height H, between about 75% and about 80% of height H, or about four-fifths or 80% of height H. Cavity width W2 may be between about 60% and about 85% of width W, between about 70% and about 80% of width W, or about 70% of width W. Cavity length L2 may be between about 60% and about 85% of length L, between about 70% and about 80% of length L, or about 70% of length L. Each of distances W1, W3, L1, and L3 may be between about 10% and about 20% (e.g., between about one-tenth and about two-tenths) of width W and/or length L, or about 15% of width W and/or length L. Each of distances W1, W3, L1, and L3 may be a thickness of interior walls 145 separating cavity 125 from a plurality of side edges of member. Each of thicknesses T1 and T2 may be between about 8% and 12% of width W and/or length L, or about 10% (e.g., one-tenth) of width W and/or length L. Depth D may be greater than either width W2 or length L2.

The exemplary disclosed system, apparatus, and method may be used in any suitable application for cleaning. The exemplary disclosed system, apparatus, and method may be used for personal hygiene. For example, the exemplary disclosed system, apparatus, and method may be used in any suitable application involving soap, shampoo, conditioner, lotion, moisturizer, and/or any other suitable cleaning or personal hygiene products. In at least some exemplary embodiments, the exemplary disclosed system, apparatus, and method may be used in any suitable application involving soap bars, shampoo bars, conditioner bars, lotion bars, and/or moisturizer bars. The exemplary disclosed system, apparatus, and method may be used in any suitable application for cleaning, personal hygiene, household cleaning, dishwashing, laundry cleaning, vehicle cleaning, and/or any other suitable cleaning application.

Figure 5:
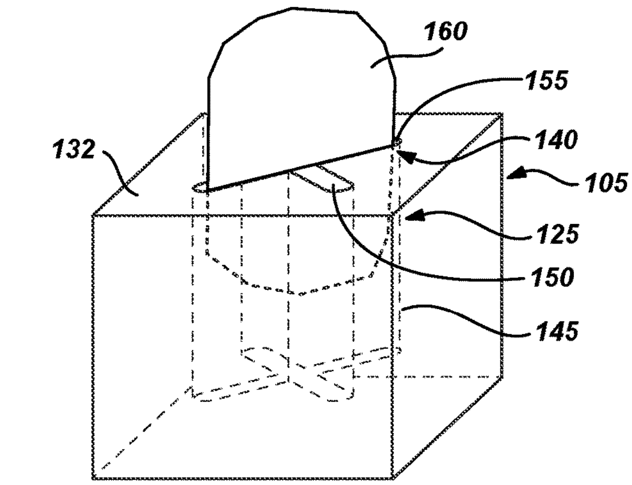
FIG. 5 is a perspective view of an exemplary embodiment of the present invention.
Figure 21:
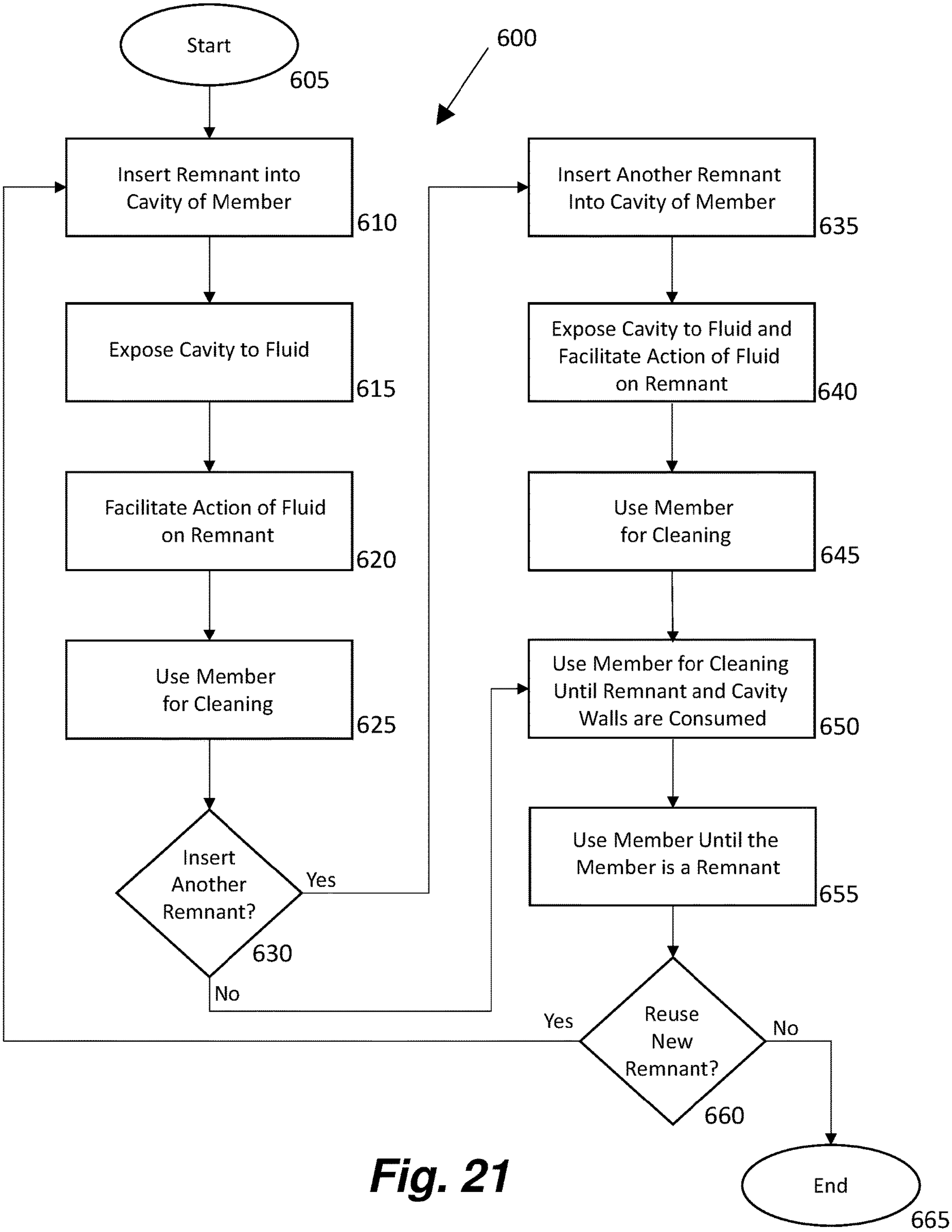
FIG. 21 illustrates an exemplary process of at least some exemplary embodiments of the present disclosure.

FIGS. 5-14 and the flowchart of FIG. 21 illustrate an exemplary operation of the exemplary disclosed system 100. As illustrated in FIG. 21, process 600 begins at step 605. At step 610, user 110 may utilize member 105. As illustrated in FIG. 5, user 110 may insert a material portion such as a remnant 160 into cavity 125 of member 105 via aperture 140. For example, remnant 160 may be inserted into first leg 150 or second leg 155. Remnant 160 may be formed from material similar to member 105. For example, remnant 160 may be a remaining portion of another member 105 that has been used over time by user 110. Remnant 160 may be a sliver or chip of a used member 105 such as, for example, a cleaning bar sliver or chip. Remnant 160 may be damp and/or soft based on previous use (e.g., previous recent use) by user 110, which may facilitate insertion of remnant 160 into cavity 125 by user 110. For example, dampened and/or softened remnant 160 may be relatively easily deformed by interior walls 145 to fit into cavity 125 as remnant 160 is inserted into cavity 125. By re-using remnant 160 in member 105, the exemplary disclosed system, apparatus, and method may provide for a significant reduction (e.g., 15-20%) of waste of cleaning material by users.

Figure 6:
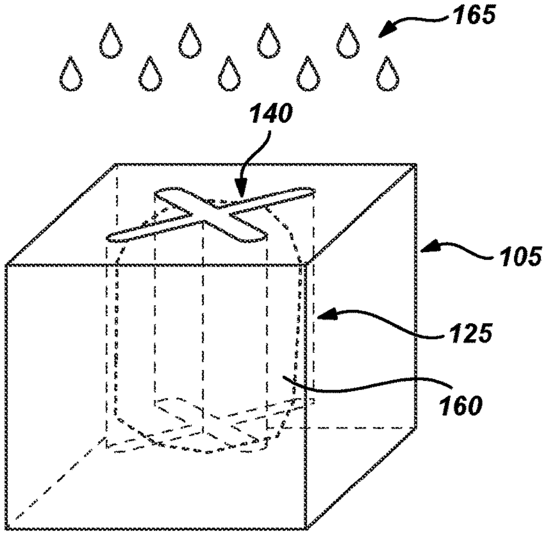
FIG. 6 is a perspective view of an exemplary embodiment of the present invention.

Returning to FIG. 21, cavity 125 holding remnant 160 may be exposed to a fluid 165 at step 615 for example as illustrated in FIG. 6. Fluid 165 may include any suitable fluid used in cleaning such as, for example, water, cleaning compound including the exemplary disclosed materials for example described above, and/or any other suitable fluid. For example, fluid 165 may be water droplets. For example, fluid 165 may be water flowing from a shower head or other water delivery device. In at least some exemplary embodiments, fluid 165 may be water from a shower being taken by user 110. Fluid 165 may partially or substantially entirely fill cavity 125 holding remnant 160. In at least some exemplary embodiments, fluid 165 may partially or substantially entirely fill cavity 125 holding remnant 160 based on member 105 being submerged in a fluid such as being submerged in a bath. In at least some exemplary embodiments, cavity 125 holding fluid 165 may include holding fluid 165 that may be moisture from water vapor, steam, ambient moisture, spray, and/or droplets (e.g., for example from a shower or a bath).

Figure 7:
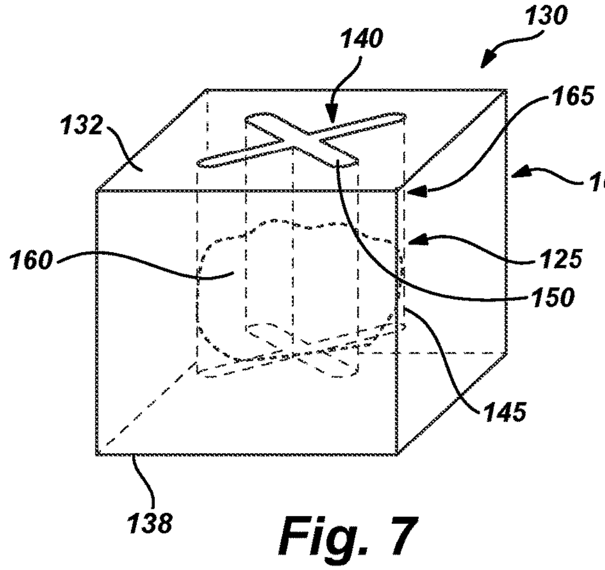
FIG. 7 is a perspective view of an exemplary embodiment of the present invention.

Returning to FIG. 21, an action or effect of fluid 165 and remnant 160 in cavity 125 may be facilitated at step 620. For example as illustrated in FIGS. 6 and 7, both fluid 165 and remnant 160 may remain disposed in cavity 125 when user 110 has finished a use of member 105 and/or when member 105 is not in use by user 110. For example and as illustrated in FIG. 6, after member 105 is used to clean for example as illustrated in FIG. 4, cavity 125 of member 105 including remnant 160 may be filled with fluid 165 and disposed with first end surface 132 and aperture 140 facing upward (e.g., placed upright) so that fluid 165 and remnant 160 are maintained (e.g., by gravity) within cavity 125. For example, second end surface 138 may provide a bottom surface (e.g., a relatively large flat bottom surface) that may allow member 105 to be stored upright without easily tipping over.

Over time (e.g., for several hours, a day, or several days) as fluid 165 and remnant 160 both are maintained in cavity 125, remnant 160 may undergo a transition as illustrated for example from the state of remnant 160 of FIG. 6 to the state of remnant 160 of FIG. 7. For example, moisture of fluid 165 may be continuously held in cavity 125 of member 105 to facilitate breakdown and melding of remnant 160 to interior walls 145. For example, moisture may be continuously held between uses such as showers or baths in which member 105 may be used by user 110. For example, fluid channels (e.g., water channels) of cavity 125 formed by interior walls 145 at or on each side of remnant 160 may further soften remnant 160 so that remnant 160 adheres to or melds with interior walls 145 (e.g., adheres, melds, and/or is integrated into member 105). For example, moisture of fluid 165 disposed in cavity 125 with remnant 160 may allow for and facilitate integration (e.g., decomposition) of remnant 160 into member 105.

Figure 8:
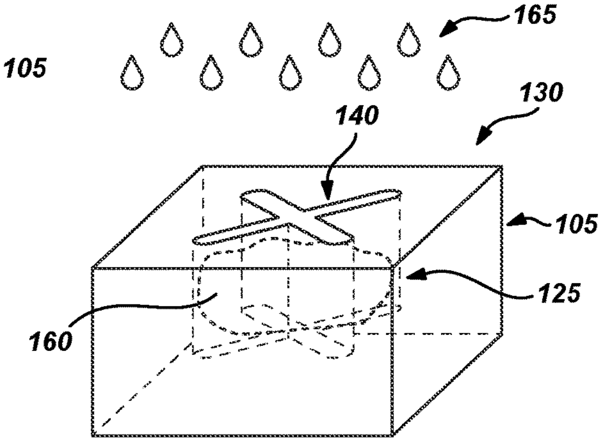
FIG. 8 is a perspective view of an exemplary embodiment of the present invention.

Returning to FIG. 21, member 105 may be used for cleaning at step 625. Steps 620 and 625 may be iteratively repeated when, for example, a user takes daily baths or showers using member 105 or uses member 105 for cleaning at given times at step 625 and sets aside member 105 at step 620 between cleanings. For example as illustrated in FIGS. 4 and 8, user 110 may use member 105 for cleaning for example by contacting (e.g., pressing and/or sliding) member 105 in plane 120 substantially parallel to surface 115. User 110 may face first end surface 132 and aperture 140 toward surface 115 while cleaning surface 115. For example, user 110 may face the "X" formed by aperture 140 toward surface 115 during cleaning. In doing so over one or more cleanings, user 110 may consume successive portions of member 105. For example, an upper portion (e.g., first end portion 130) may be consumed (e.g., worn away) during cleaning from a state illustrated in FIG. 7 to a state illustrated in FIG. 8. Height H of member 105 may be reduced or decreased as material of member 105 is consumed during cleaning. As height H of member 105 is reduced or decreased, depth D of cavity 125 may also be reduced or decreased. Also, as material of member 105 is consumed, material of remnant 160 may be similarly consumed or used in cleaning. For example, material of remnant 160 may be adhered, bonded to, integrated with, and/or melded to material of member 105 via interior walls 145, and accordingly integrated material of member 105 and remnant 160 may be consumed together as height H and depth D are reduced or decreased (e.g., based on downward abrasion and/or wear during each use of one or multiple periods of use).

Returning to FIG. 21, user 110 may decide whether or not to insert an additional remnant 170 into cavity 125 of member 105 at step 630. If user 110 decides not to insert additional remnant 170 into cavity 125, process 600 proceeds to step 650 as described below. If user 110 decides to insert additional remnant 170 into cavity 125, process 600 proceeds to step 635.

Figure 9:
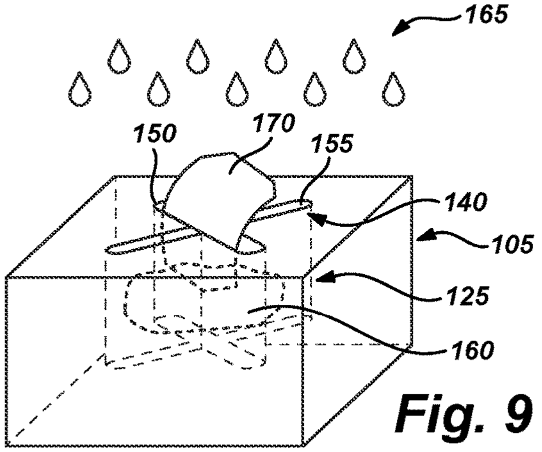
FIG. 9 is a perspective view of an exemplary embodiment of the present invention.

At step 635, user 110 may insert additional remnant 170 into cavity 125 via aperture 140 for example as illustrated in FIG. 9. For example, if user 110 previously inserted remnant 160 into first leg 150 at step 610, then user 110 may insert remnant 170 into second leg 155. Also for example, if user 110 previously inserted remnant 160 into second leg 155 at step 610, then user 110 may insert remnant 170 into first leg 150. Similar to as described above at step 635 regarding remnant 160, dampened and/or softened additional remnant 170 may be relatively easily deformed by interior walls 145 and/or portions of remnant 160, which may be integrated with member 105, to fit into cavity 125 as additional remnant 170 is inserted into cavity 125.

Figure 10:
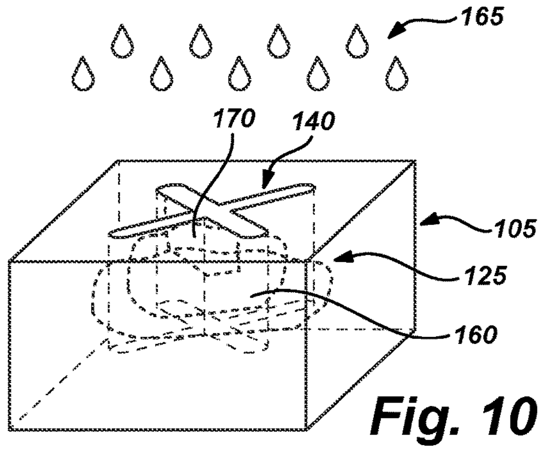
FIG. 10 is a perspective view of an exemplary embodiment of the present invention.
Figure 11:
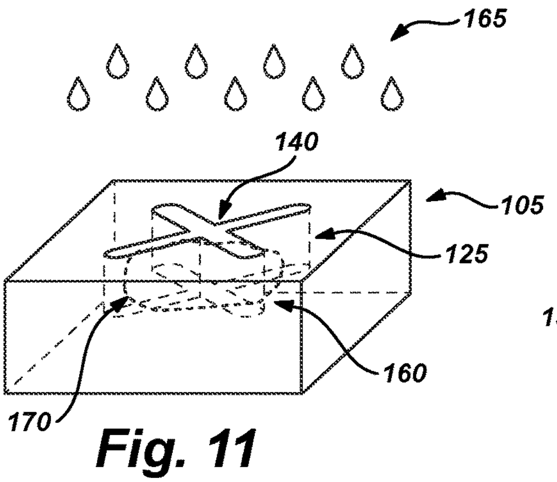
FIG. 11 is a perspective view of an exemplary embodiment of the present invention.

Returning to FIG. 21, cavity 125 holding remnants 160 and 170 may be exposed to fluid 165 at step 640 for example as illustrated in FIG. 10, which may be similar to step 615 described above. Also at step 640, an action or effect of fluid 165, remnant 160, and remnant 170 in cavity 125 may be facilitated, which may be similar to step 620 described above.

Returning to FIG. 21, member 105 may be used for cleaning at step 645, which may be similar to step 625 described above. Steps 640 and 645 may be iteratively repeated, similarly to steps 620 and 625. Over time and similarly to as described above, as fluid 165, remnant 160, and remnant 170 are all maintained in cavity 125, remnants 160 and 170 may undergo a transition as illustrated for example from the state of remnants 160 and 170 of FIG. 10 to the state of remnants 160 and 170 of FIG. 11. For example, moisture of fluid 165 may be continuously held in cavity 125 of member 105 to facilitate breakdown and melding of remnants 160 and 170 to interior walls 145.

Figure 12:
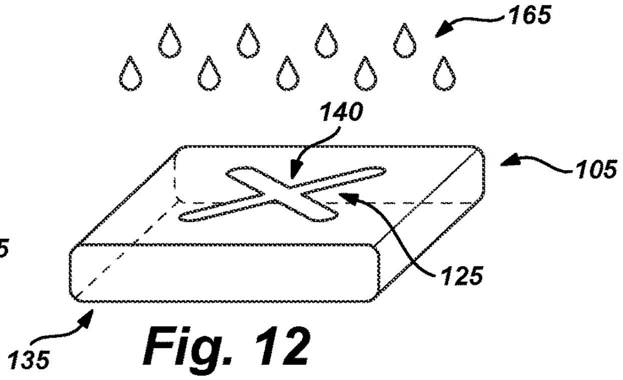
FIG. 12 is a perspective view of an exemplary embodiment of the present invention.

Returning to FIG. 21, member 105 may continue to be used for cleaning at either step 625 or step 645. Member 105 may be used for cleaning as described above until process 600 proceeds to step 650. For example at step 650, user 110 may use member 105 for cleaning until substantially all of remnant 160 (e.g., and remnant 170), interior walls 145, and cavity 125 are consumed for example as illustrated in FIG. 12. For example as illustrated in FIG. 12, aperture 140 and cavity 125 may be reduced to an indentation into a remaining portion (e.g., second end portion 135) of member 105.

Figure 13:
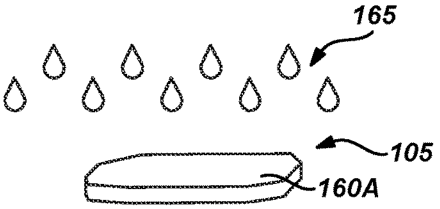
FIG. 13 is a perspective view of an exemplary embodiment of the present invention.

Returning to FIG. 21, member 105 may continue to be used for cleaning at step 655 until cavity 125 and aperture 140 have been substantially entirely consumed and member 105 is consumed and reduced to a new remnant 160A for example as illustrated in FIG. 13.

Figure 14:
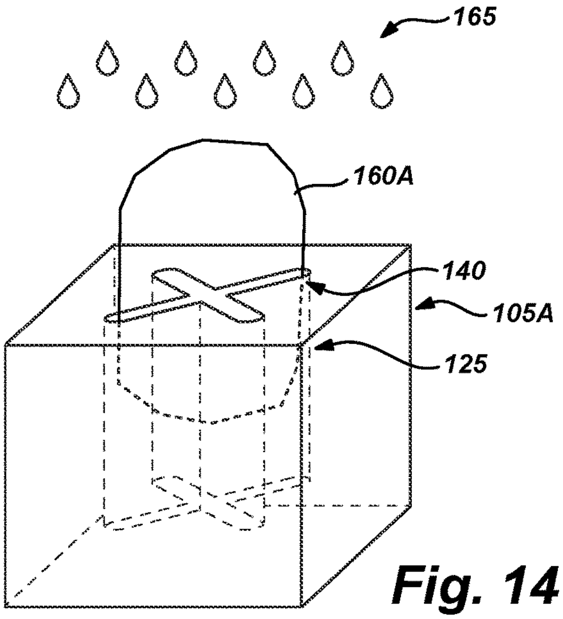
FIG. 14 is a perspective view of an exemplary embodiment of the present invention.

Returning to FIG. 21, user 110 may determine whether or not to reuse new remnant 160A at step 660. If user 110 decides to reuse new remnant 160A, new remnant 160A may be inserted into cavity 125 via aperture 140 of a new member 105A for example as illustrated in FIG. 14. Returning to FIG. 21, process 600 may return to step 610, with new remnant 160A being used similarly to remnant 160 for example as described above. Steps 610 through 660 may be repeated for as many iterations as desired, with successive new members 105 being reduced to successive new remnants 160A that may be reused in successive new members 105A. Process 600 may thereby repeat indefinitely as desired, thereby reusing and completely consuming each new remnant 160A using each successive new member 105A. If user 110 decides not to reuse new remnant 160A, process 600 ends at step 665.

Figure 15:
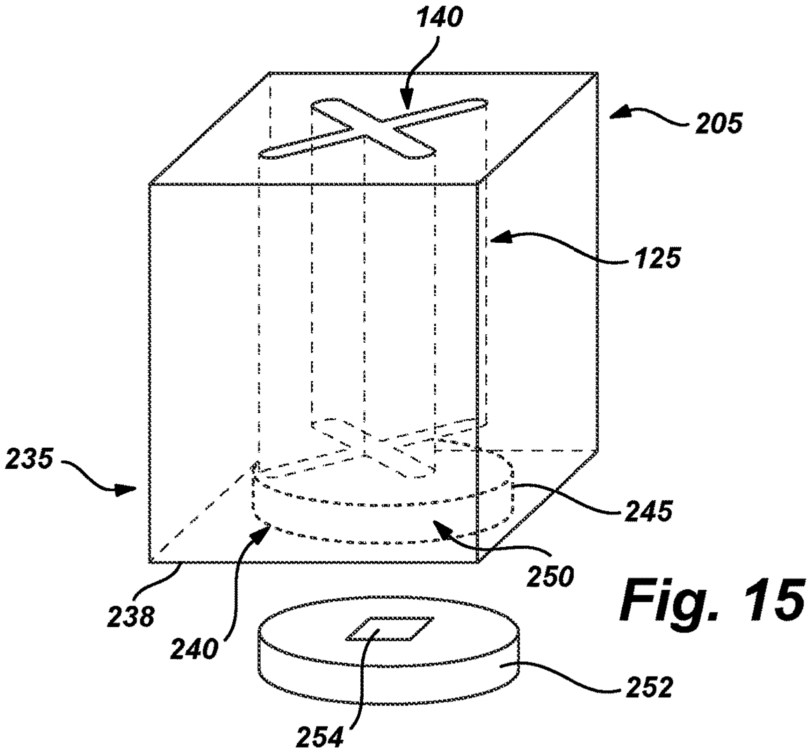
FIG. 15 is a perspective view of an exemplary embodiment of the present invention.
Figure 15A:
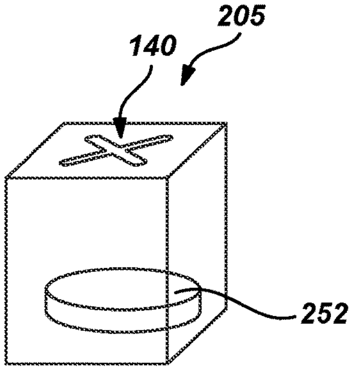
FIG. 15A is a perspective view of an exemplary embodiment of the present invention.

FIGS. 15 and 15A illustrate another exemplary embodiment of the exemplary disclosed system, apparatus, and method. Member 205 may be generally similar to member 105. Member 205 may include a recess 250 that may be disposed at an end portion 235 forming an end surface 238 (e.g., bottom surface) of member 205. Interior walls 245 forming recess 250 may form a recess aperture 240 at end surface 238. Recess 250 may be configured to receive (e.g., removably receive) a lighting assembly 252.

Lighting assembly 252 may be any suitable device for providing light at or within member 205. Member 205 may be formed from similar material as member 105, including for example translucent and/or transparent material through which light of lighting assembly 252 may pass. For example, member 205 may be formed from clear glycerin material. Lighting assembly 252 may for example be a battery-powered light including a battery. In at least some exemplary embodiments, lighting assembly 252 may be a USB-rechargeable light. Lighting assembly 252 may be a light-emitting diode lighting device. Lighting assembly 252 may include a user interface (e.g., buttons, switches, and/or any other suitable interface) that may allow users to change or switch light colors emitted by lighting assembly 252 and/or settings that cycle through different colors and/or effects (e.g., flashing, dimming, changing intensity, and/or any other desired effect).

Lighting assembly 252 may be removably received in recess 250 and removably attached to member 205 via a fastener 254. For example, fastener 254 may be a protrusion that may be removably pressed into one or more interior walls 245 forming recess 250. Fastener 254 may be an adhesive member that may be removably adhered to one or more interior walls 245. Lighting assembly 252 may also be removably attached within recess 250 using any suitable mechanical, press-fit, magnetic, adhesive, friction-fit (e.g., being held in place via friction), and/or other suitable fastening method. Lighting assembly 252 may also be molded into member 205.

Member 205 including lighting assembly 252 may be used in process 600. For example after member 205 has been used until member 205 is a remnant (e.g., or close to a remnant), lighting assembly 252 may be removed from the remnant of member 205. The remnant may be reused as a remnant for example as described above, and lighting assembly 252 may be removably inserted into recess 250 of a new member 205. Lighting assembly 252 may be repeatedly reused for as many iterations of process 600 as desired. For example, lighting assembly 252 may be removed from the remnant, recharged if desired, and reused in a new member 205. In at least some exemplary embodiments, member 205 including lighting assembly 252 may thereby be used in low-light bath and shower events and/or other desired activities as a form of relaxing entertainment.

Figure 16:
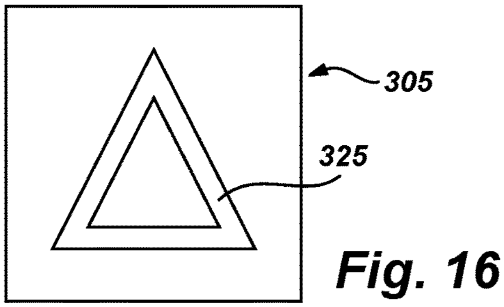
FIG. 16 is a top view of an exemplary embodiment of the present invention.
Figure 17:
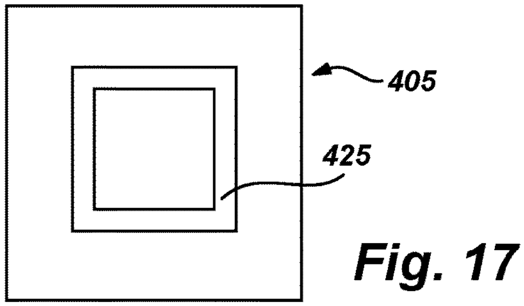
FIG. 17 is a top view of an exemplary embodiment of the present invention.
Figure 18:
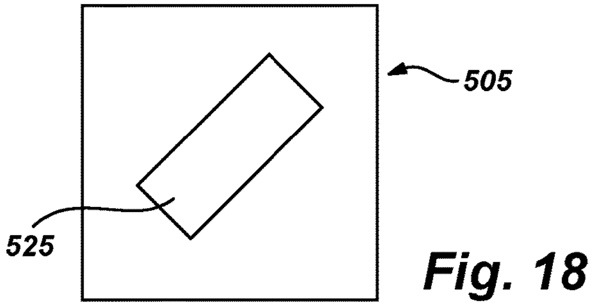
FIG. 18 is a top view of an exemplary embodiment of the present invention.
Figure 18A:
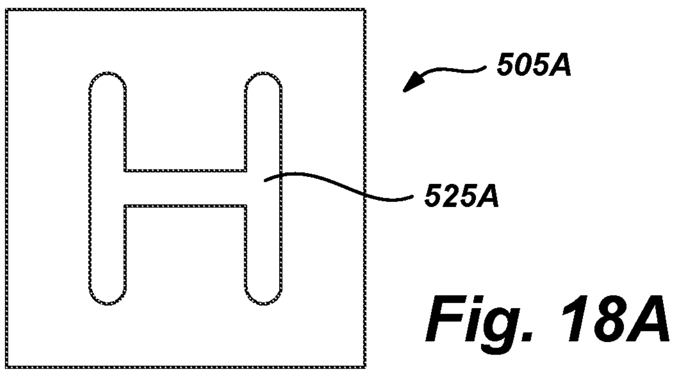
FIG. 18A is a top view of an exemplary embodiment of the present invention.
Figure 18B:
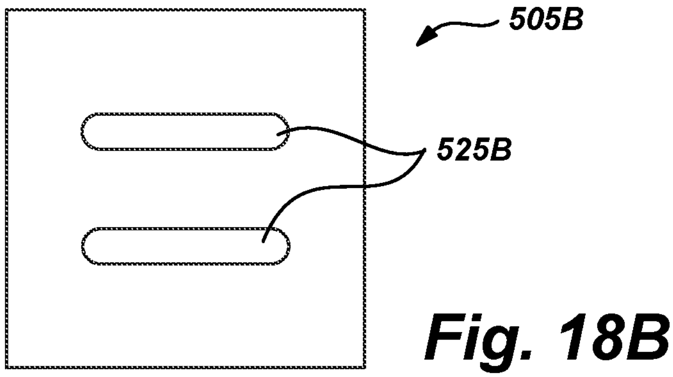
FIG. 18B is a top view of an exemplary embodiment of the present invention.
Figure 18C:
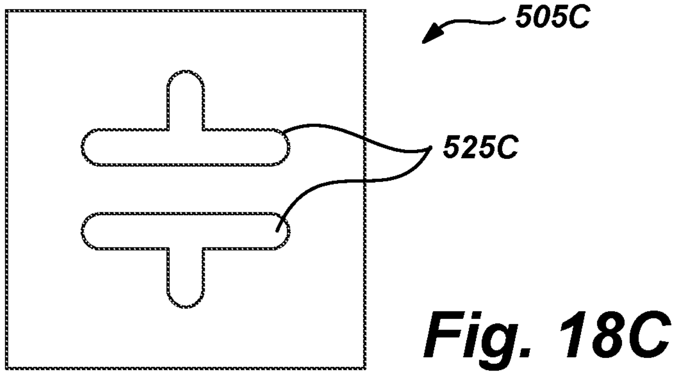
FIG. 18C is a top view of an exemplary embodiment of the present invention.

FIGS. 16-18C illustrate additional exemplary embodiments of the exemplary disclosed system, apparatus, and method. FIG. 16 illustrates a member 305 that may be generally similar to member 105 and that may include a cavity 325 that may be generally similar to cavity 125. Cavity 325 may for example have a triangular configuration for receiving one or more remnants. FIG. 17 illustrates a member 405 that may be generally similar to member 105 and that may include a cavity 425 that may be generally similar to cavity 125. Cavity 425 may for example have a square or rectangular configuration for receiving one or more remnants. FIG. 18 illustrates a member 505 that may be generally similar to member 105 and that may include a cavity 525 that may be generally similar to cavity 125. Cavity 525 may for example have a slot, slash, or linear configuration for receiving one or more remnants. FIG. 18A illustrates a member 505A that may be generally similar to member 105 and that may include a cavity 525A that may be generally similar to cavity 125. Cavity 525A may for example have an H-shaped configuration for receiving one or more remnants. FIG. 18B illustrates a member 505B that may be generally similar to member 105 and that may include a plurality of cavities 525B that may be generally similar to cavity 125. Cavities 525B may for example have a slot, slash, or linear configuration for receiving one or more remnants and may for example form an "equals sign" shape. FIG. 18C illustrates a member 505C that may be generally similar to member 105 and that may include a plurality of cavities 525C that may be generally similar to cavity 125. Cavities 525C may for example have a slot, slash, or linear configuration having a protruding portion as illustrated in FIG. 18C and may receive one or more remnants. Members 305, 405, 505, 505A, 505B, and 505C may be used similarly to member 105 in process 600 for example as described above.

Figure 19:
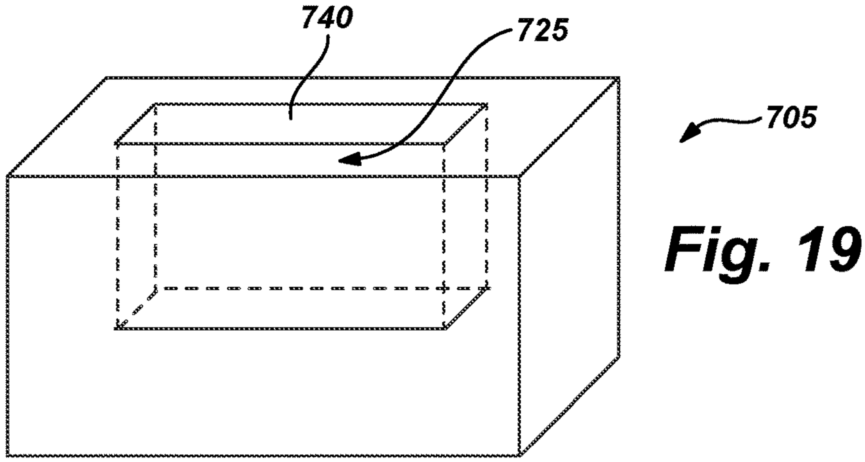
FIG. 19 is a perspective view of an exemplary embodiment of the present invention.

FIG. 19 illustrates an additional exemplary embodiment of the exemplary disclosed system, apparatus, and method. FIG. 19 illustrates a member 705 that may be generally similar to member 105 and that may include a cavity 725 that may be generally similar to cavity 125. Member 705 may have a rectangular or polygonal prism shape with an aperture 740 of cavity 725 extending along a relatively longer side of member 705. Member 705 may be used similarly to member 105 in process 600 for example as described above.

Figure 20A:
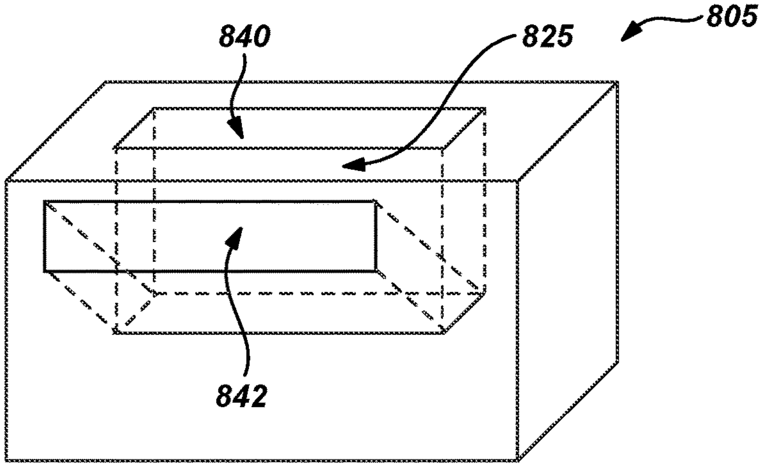
FIG. 20A is a perspective view of an exemplary embodiment of the present invention.
Figure 20B:
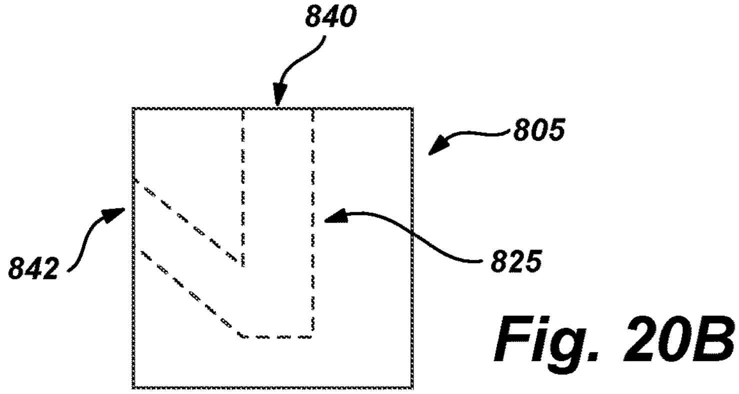
FIG. 20B is a side view of an exemplary embodiment of the present invention.

FIGS. 20A and 20B illustrate an additional exemplary embodiment of the exemplary disclosed system, apparatus, and method. FIGS. 20A and 20B illustrate a member 805 that may be generally similar to member 105 and that may include a cavity 825 that may be generally similar to cavity 125. Cavity 825 may include apertures at multiple sides of member 805. For example, cavity 825 may include a first aperture 840 disposed at a first (e.g., top) surface of member 805 and a second aperture 842 disposed at a second (e.g., side) surface of member 805. Member 805 may be used similarly to member 105 in process 600 for example as described above.

In at least some exemplary embodiments, remnant 160 (e.g., and remnant 170) may be completely used (e.g., substantially completely used) before reaching the end of a newer cleaning member (e.g., bar). The exemplary disclosed member may maintain structural integrity (e.g., a maximum structural integrity) around the exemplary disclosed remnant until the remnant is substantially entirely consumed. The exemplary disclosed member may thereby avoid an overall structure that may weaken and/or fragment (e.g., flake away) as the member including the fragment is used.

In at least some exemplary embodiments, as the exemplary disclosed member is worn down, structural integrity (e.g., full structural integrity) of the member (e.g., bar) may remain around all corners of the member, which may eliminate flaking off and/or breakdown of the member. Remnants held in a cavity of the member may thereby be depleted (e.g., completely depleted) while a portion of the member remains (e.g., remains intact) below the remnant. Substantially eliminating (e.g., completely eliminating) all remnants held in the exemplary disclosed cavity may prevent preservation of old remnants, which may prevent sanitary issues such as old remnants (e.g., including old soap oils) becoming rancid.

In at least some exemplary embodiments, the exemplary disclosed method may include providing a cleaning member (e.g., member 105, member 205, member 305, member 405, member 505, member 505A, member 505B, member 505C, member 705, or member 805) formed from a consumable cleaning material and including a cavity (e.g., cavity 125, cavity 325, cavity 425, cavity 525, cavity 525A, cavity 525B, cavity 525C, cavity 725, or cavity 825) formed by one or more interior walls of the cleaning member, inserting a cleaning member remnant through an aperture of the cavity formed at a first end surface of a first end portion of the cleaning member, providing and holding a fluid in the cavity holding the cleaning member remnant when the first end surface is facing upward, and attaching the cleaning member remnant to the one or more interior walls based on holding the fluid. The exemplary disclosed method may also include cleaning a surface by contacting the first end surface against the surface, consuming the first end portion, the one or more interior walls, and the cleaning member remnant attached to the one or more interior walls by cleaning the surface until the cleaning member is reduced to a second cleaning member remnant, and inserting the second cleaning member remnant into a second cavity of a second cleaning member. The exemplary disclosed method may further include providing and holding the fluid in the second cavity holding the second cleaning member remnant, and attaching the second cleaning member remnant to the second cleaning member based on providing and holding the fluid. The exemplary disclosed method may also include consuming a portion of the second cleaning member attached to the second cleaning member remnant and the second cleaning member remnant until the second cleaning member is reduced to a third cleaning member remnant, and inserting the third cleaning member remnant into a third cavity of a third cleaning member. The second cleaning member may be formed from the consumable cleaning material. The second cavity may be formed by one or more second interior walls of the second cleaning member. The exemplary disclosed method may further include inserting a second cleaning member remnant through the aperture of the cavity after attaching the cleaning member remnant to the one or more interior walls. The exemplary disclosed method may also include removably attaching a lighting assembly at a recess of a second end portion that is disposed at an opposite side of the cleaning member as the first end portion. The fluid is water and the cleaning member remnant may also be formed from the consumable cleaning material that is at least one selected from the group of soap, shampoo, conditioner, and combinations thereof. The cavity may be X-shaped and has a depth extending through four-fifths of a height of the cleaning member.

In at least some exemplary embodiments, the exemplary disclosed apparatus may be an apparatus for integrating a cleaning member remnant using a fluid. The exemplary disclosed apparatus may include a cleaning member (e.g., member 105, member 205, member 305, member 405, member 505, member 505A, member 505B, member 505C, member 705, or member 805) formed from consumable cleaning material, and a cavity (e.g., cavity 125, cavity 325, cavity 425, cavity 525, cavity 525A, cavity 525B, cavity 525C, cavity 725, or cavity 825) formed in the cleaning member by one or more interior walls of the cleaning member. The cavity may be configured to receive the cleaning member remnant through an aperture of the cavity disposed at a first surface of a first end portion of the cleaning member. A second end portion of the cleaning member, which may be disposed at an opposite side of the cleaning member as the first end portion, may form at least part of the one or more interior walls of the cavity and may form a second surface. The cavity may be configured to hold the cleaning member remnant and the fluid when the cleaning member is supported on the second surface. A depth of the cavity may be equal to between 75% and 85% of a height of the cleaning member measured between the first surface and the second surface. The cavity may be X-shaped and may include a first leg configured to receive the cleaning member remnant and a second leg configured to receive the cleaning member remnant. The exemplary disclosed apparatus may also include a recess disposed at the second end portion and forming a recess aperture at the second surface, the recess configured to removably receive a lighting assembly. A width of the cavity may be between 60% and 85% of a width of the cleaning member, a length of the cavity may be between 60% and 85% of a length of the cleaning member, and a depth of the cavity may be between 70% and 85% of a height of the cleaning member measured between the first surface and the second surface. A width of the cavity may be 70% of a width of the cleaning member, a length of the cavity may be 70% of a length of the cleaning member, and a depth of the cavity may be 80% of a height of the cleaning member measured between the first surface and the second surface. A depth of the cavity extending from the first surface toward the second surface may be greater than either a width or a length of the cavity measured perpendicularly to the depth of the cavity. A thickness of the one or more interior walls separating the cavity from a plurality of side edges of the cleaning member may be between one-tenth and two-tenths of either a length or a width of the cleaning member. A thickness of the cavity may be one-tenth of either a width or a length of the cleaning member. The fluid may be water and the cleaning member remnant may also be formed from the consumable cleaning material that may be at least one selected from the group of soap, shampoo, conditioner, and combinations thereof.

In at least some exemplary embodiments, the exemplary disclosed method may include providing a first bar (e.g., member 105, member 205, member 305, member 405, member 505, member 505A, member 505B, member 505C, member 705, or member 805) including a cavity (e.g., cavity 125, cavity 325, cavity 425, cavity 525, cavity 525A, cavity 525B, cavity 525C, cavity 725, or cavity 825) formed by one or more interior walls of the first bar, inserting a first bar remnant through an aperture of the cavity formed at a first end surface of a first end portion of the first bar, and providing and holding water in the cavity holding the first bar remnant when the first end surface is facing upward. The exemplary disclosed method may also include attaching the first bar remnant to the one or more interior walls based on holding the water, cleaning a surface by contacting the first end surface against the surface, consuming the first end portion, the one or more interior walls, and the first bar remnant attached to the one or more interior walls by cleaning the surface until the first bar is reduced to a second bar remnant, and inserting the second bar remnant into a second cavity of a second bar. Each of the first bar, the first bar remnant, the second bar, and the second bar remnant may be formed from at least one selected from the group of soap, shampoo, conditioner, and combinations thereof.

In at least some exemplary embodiments, the exemplary disclosed system, apparatus, and method may provide an efficient and effective system for integrating a remnant of cleaning material into a relatively newer portion of cleaning material such as a bar of soap, shampoo, or conditioner. The exemplary disclosed system, apparatus, and method may cause relatively older cleaning material to adhere and bond to and become integrated into relatively newer cleaning material. The exemplary disclosed system, apparatus, and method may provide for the relatively older remnants of cleaning material to be substantially entirely used prior to the relatively newer cleaning material being expended. The exemplary disclosed system, apparatus, and method may thereby substantially prevent relatively older portions of cleaning material from being merely preserved in relatively newer cleaning material as the relatively newer cleaning material is used. The exemplary disclosed system, apparatus, and method may reduce packaging waste associated with consumed cleaning products, thereby preventing harm to the environment.

It will be apparent to those skilled in the art that various modifications and variations can be made to the exemplary disclosed apparatus, system, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A method, comprising:

providing a first cleaning member including a cavity formed by one or more interior walls of the first cleaning member, the first cleaning member including a first end surface of a first end portion and also a plurality of side surfaces disposed adjacent to the first end surface;

inserting a first cleaning member remnant through an aperture of the cavity formed at the first end surface of the first end portion of the first cleaning member;

providing and holding water in the cavity holding the first cleaning member remnant when the first end surface is facing upward;

attaching the first cleaning member remnant to the one or more interior walls based on holding the water;

cleaning a surface by contacting the first end surface against the surface;

consuming the first end portion, the one or more interior walls, and the first cleaning member remnant attached to the one or more interior walls by cleaning the surface until the first cleaning member is reduced to a second cleaning member remnant; and inserting the second cleaning member remnant into a second cavity of a second cleaning member;

wherein each of the first cleaning member, the first cleaning member remnant, the second cleaning member, and the second cleaning member remnant is formed from a consumable cleaning material;

wherein the first end surface is as large as or larger than each of the plurality of side surfaces;

when providing and holding the fluid in the cavity holding the first cleaning member remnant, disposing the first cleaning member remnant that is an elongated remnant in a slot of the cavity with a longest side of the elongated remnant extending along the slot, the slot extending from the aperture of the cavity formed at the first end surface toward a second end portion that is disposed at an opposite side of the first cleaning member as the first end portion;

wherein the cavity is X-shaped and includes a first leg configured to receive the first cleaning member remnant and a second leg configured to receive the first cleaning member remnant; and wherein a depth of the cavity is greater than either a width of the cavity or a length of the cavity measured parallel to one of the plurality of side surfaces.

2. The method of claim 1, wherein the first end surface remains as large as or larger than each of the plurality of side surfaces as the first end portion, the one or more interior walls, and the first cleaning member remnant are consumed.

3. The method of claim 1, wherein:

a length of the first end surface is greater than or equal to each length of each of the plurality of side surfaces; and a width of the first end surface is greater than or equal to each width of each of the plurality of side surfaces.

4. The method of claim 1, further comprising removably attaching a lighting assembly at a recess of a second end portion that is disposed at an opposite side of the first cleaning member as the first end portion.

5. The method of claim 1, wherein the fluid is water.

6. The method of claim 1, further comprising:

providing and holding the fluid in the second cavity holding the second cleaning member remnant; and attaching the second cleaning member remnant to the second cleaning member based on providing and holding the fluid.

7. The method of claim 6, further comprising:

consuming a portion of the second cleaning member attached to the second cleaning member remnant and the second cleaning member remnant until the second cleaning member is reduced to a third cleaning member remnant; and inserting the third cleaning member remnant into a third cavity of a third cleaning member.

8. The method of claim 7, wherein the third cleaning member is formed from the consumable cleaning material.

9. A method, comprising:

providing a first bar including a cavity formed by one or more interior walls of the first bar, the first bar including a first end surface of a first end portion and also a plurality of side surfaces disposed adjacent to the first end surface;

inserting a first bar remnant through an aperture of the cavity formed at the first end surface of the first end portion of the first bar;

providing and holding water in the cavity holding the first bar remnant when the first end surface is facing upward;

attaching the first bar remnant to the one or more interior walls based on holding the water;

cleaning a surface by contacting the first end surface against the surface;

consuming the first end portion, the one or more interior walls, and the first bar remnant attached to the one or more interior walls by cleaning the surface until the first bar is reduced to a second bar remnant; and inserting the second bar remnant into a second cavity of a second bar;

wherein each of the first bar, the first bar remnant, the second bar, and the second bar remnant is formed from at least one selected from the group of soap, shampoo, conditioner, and combinations thereof;

wherein a surface area of the first end surface is greater than or equal to each surface area of each of the plurality of side surfaces;

when providing and holding the fluid in the cavity holding the cleaning member remnant, disposing the cleaning member remnant that is an elongated remnant vertically in a vertical slot of the cavity with a longest side of the elongated remnant extending vertically in the vertical slot, the vertical slot extending from the aperture of the cavity formed at the first end surface toward a second end portion that is disposed at an opposite side of the cleaning member as the first end portion;

wherein the cavity is X-shaped and includes a first leg configured to receive the first bar remnant and a second leg configured to receive the first bar remnant; and wherein a depth of the cavity is greater than either a width of the cavity or a length of the cavity measured parallel to one of the plurality of side surfaces.

10. The method of claim 9, wherein the first end surface remains as large as or larger than each of the plurality of side surfaces as the first end portion, the one or more interior walls, and the first bar remnant are consumed.

11. The method of claim 9, wherein:

a length of the first end surface is greater than or equal to each length of each of the plurality of side surfaces; and a width of the first end surface is greater than or equal to each width of each of the plurality of side surfaces.

12. The method of claim 9, further comprising removably attaching a lighting assembly at a recess of a second end portion that is disposed at an opposite side of the first bar as the first end portion.

13. The method of claim 9, wherein the fluid is water.

14. The method of claim 9, further comprising:

providing and holding the fluid in the second cavity holding the second bar remnant; and attaching the second bar remnant to the second bar based on providing and holding the fluid.

15. The method of claim 14, further comprising:

consuming a portion of the second bar attached to the second bar remnant and the second bar remnant until the second bar is reduced to a third bar remnant; and inserting the third bar remnant into a third cavity of a third bar.

16. The method of claim 15, wherein the third bar is formed from at least one selected from the group of the soap, the shampoo, conditioner, and combinations thereof.

17. A method, comprising:

providing a first bar including a cavity formed by one or more interior walls of the first bar, the first bar including a first end surface of a first end portion and also a plurality of side surfaces disposed adjacent to the first end surface;

inserting a first bar remnant through an aperture of the cavity formed at the first end surface of the first end portion of the first bar;

providing and holding water in the cavity holding the first bar remnant when the first end surface is facing upward;

attaching the first bar remnant to the one or more interior walls based on holding the water;

cleaning a surface by contacting the first end surface against the surface;

consuming the first end portion, the one or more interior walls, and the first bar remnant attached to the one or more interior walls by cleaning the surface until the first bar is reduced to a second bar remnant; and inserting the second bar remnant into a second cavity of a second bar;

wherein each of the first bar, the first bar remnant, the second bar, and the second bar remnant is formed from at least one selected from the group of soap, shampoo, conditioner, and combinations thereof;

wherein a surface area of the first end surface is greater than or equal to each surface area of each of the plurality of side surfaces; and when providing and holding the fluid in the cavity holding the cleaning member remnant, disposing the cleaning member remnant that is an elongated remnant vertically in a vertical slot of the cavity with a longest side of the elongated remnant extending vertically in the vertical slot, the vertical slot extending from the aperture of the cavity formed at the first end surface toward a second end portion that is disposed at an opposite side of the cleaning member as the first end portion;

providing and holding the fluid in the second cavity holding the second bar remnant; and attaching the second bar remnant to the second bar based on providing and holding the fluid;

wherein the fluid is water;

wherein the cavity is X-shaped and includes a first leg configured to receive the first bar remnant and a second leg configured to receive the first bar remnant; and wherein a depth of the cavity is greater than either a width of the cavity or a length of the cavity measured parallel to one of the plurality of side surfaces.

18. The method of claim 17, wherein the first end surface remains as large as or larger than each of the plurality of side surfaces as the first end portion, the one or more interior walls, and the first bar remnant are consumed.

19. The method of claim 17, wherein:

a length of the first end surface is greater than or equal to each length of each of the plurality of side surfaces; and a width of the first end surface is greater than or equal to each width of each of the plurality of side surfaces.

20. The method of claim 17, further comprising removably attaching a lighting assembly at a recess of a second end portion that is disposed at an opposite side of the first bar as the first end portion.

* * * * *